(12) United States Patent
Grittke et al.

(10) Patent No.: US 8,745,692 B2
(45) Date of Patent: Jun. 3, 2014

(54) METHOD FOR SECURING THE EXCHANGE OF DATA BETWEEN AN EXTERNAL ACCESS UNIT AND FIELD DEVICE

(75) Inventors: Udo Grittke, Lorrach (DE); Christian Seiler, Auggen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 1603 days.

(21) Appl. No.: 10/488,258

(22) PCT Filed: Sep. 11, 2002

(86) PCT No.: PCT/EP02/10186
§ 371 (c)(1),
(2), (4) Date: Sep. 28, 2004

(87) PCT Pub. No.: WO03/023541
PCT Pub. Date: Mar. 20, 2003

(65) Prior Publication Data
US 2005/0033886 A1   Feb. 10, 2005

(30) Foreign Application Priority Data
Sep. 12, 2001   (DE) .................................. 101 44 971

(51) Int. Cl.
*G06F 21/00* (2013.01)
(52) U.S. Cl.
USPC .................................. 726/2; 726/11; 713/178
(58) Field of Classification Search
USPC ............................................................. 726/2
See application file for complete search history.

(56) References Cited

U.S. PATENT DOCUMENTS

| | | | |
|---|---|---|---|
| 4,335,591 A | 6/1982 | Gillespie | 68/12 R |
| 4,886,590 A | 12/1989 | Tittle | |
| 5,307,346 A * | 4/1994 | Fieldhouse | 370/254 |
| 5,404,288 A * | 4/1995 | McDunn | 700/21 |
| 5,544,333 A * | 8/1996 | Frazier et al. | 710/124 |
| 5,604,490 A | 2/1997 | Blakley, III et al. | |
| 5,970,430 A * | 10/1999 | Burns et al. | 702/122 |
| 6,067,477 A * | 5/2000 | Wewalaarachchi et al. | 700/83 |
| 6,108,786 A * | 8/2000 | Knowlson | 726/11 |
| 6,144,379 A * | 11/2000 | Bertram et al. | 715/835 |

(Continued)

FOREIGN PATENT DOCUMENTS

| | | |
|---|---|---|
| EP | 0 495 397 A2 | 7/1992 |
| EP | 1 045 302 A1 | 10/2000 |
| WO | WO 01/30022 A2 | 4/2001 |

OTHER PUBLICATIONS

Anonymous: "Sipart DR20 Controllers", Siemens MP31—1998 'Online! Dec. 31, 1998.

(Continued)

*Primary Examiner* — Kambiz Zand
*Assistant Examiner* — Yonas Bayou
(74) *Attorney, Agent, or Firm* — Bacon & Thomas, PLLC

(57) ABSTRACT

A method for safe data communication via WAN, LAN (e.g. Internet) between at least one external access unit and a field device, or a field bus adapter for determining or monitoring at least one physical or chemical process parameter. According to the method unauthorized accessing of a field device, or a field bus adapter, in the field is blocked in that the operator of the field device or the field bus adapter permits the external access unit to have targeted access to the field device, or the field bus adapter.

22 Claims, 2 Drawing Sheets

(56) References Cited

U.S. PATENT DOCUMENTS

| | | | |
|---|---|---|---|
| 6,170,019 B1* | 1/2001 | Dresel et al. | 719/330 |
| 6,223,287 B1* | 4/2001 | Douglas et al. | 713/178 |
| 6,298,377 B1* | 10/2001 | Hartikainen et al. | 709/223 |
| 6,332,287 B1* | 12/2001 | Geraldson | 47/79 |
| 6,370,448 B1* | 4/2002 | Eryurek | 700/282 |
| 6,788,980 B1* | 9/2004 | Johnson | 700/1 |
| 6,799,195 B1* | 9/2004 | Thibault et al. | 709/203 |
| 6,885,185 B1* | 4/2005 | Makinson et al. | 324/142 |
| 7,010,294 B1* | 3/2006 | Pyotsia et al. | 455/420 |
| 2001/0016891 A1* | 8/2001 | Hagino | 710/129 |
| 2003/0093519 A1* | 5/2003 | Jackson et al. | 709/224 |
| 2005/0120070 A1* | 6/2005 | Griech et al. | 709/200 |
| 2011/0191062 A1* | 8/2011 | Grittke et al. | 702/182 |

OTHER PUBLICATIONS

Prozessleitsystem SIMATIC PCS 7, Siemens AG, Aug. 2001; http://www.IS.siemens.de/water/websites/ftp/PCS7-Description-German.pdf.

\* cited by examiner

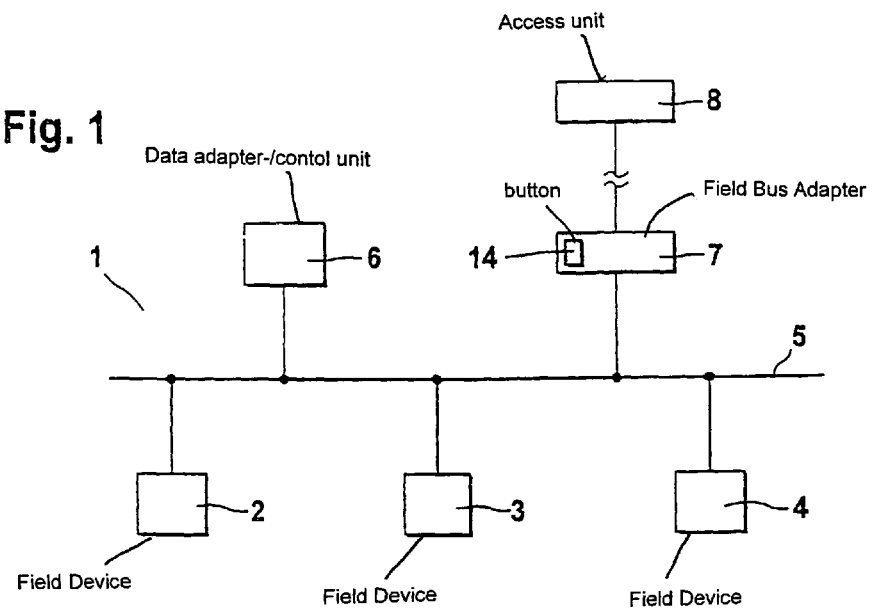
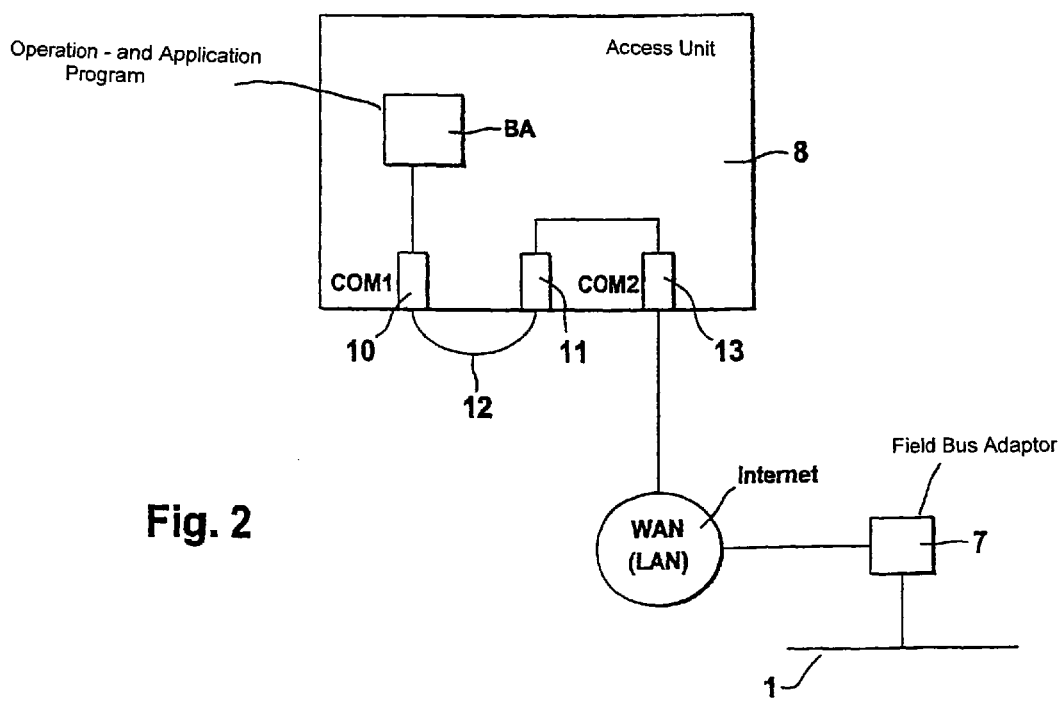

METHOD FOR SECURING THE EXCHANGE OF DATA BETWEEN AN EXTERNAL ACCESS UNIT AND FIELD DEVICE

TECHNICAL FIELD

The invention relates to a method for safe data communication via wide-area networks (WAN) and local-area networks (LAN), e.g. Internet, between at least one external access unit and a field device for determining or monitoring at least one physical or chemical process parameter, or between at least one remote access unit and a central data capture-/control-unit for data capture from, or control of, a plurality of field devices, which serve for determining or monitoring at least one physical or chemical process parameter. Examples of process parameters are fill level of a medium in a container, and the pressure, temperature, flow rate, conductivity or pH of a medium.

BACKGROUND OF THE INVENTION

In process control engineering, usually a plurality of field devices are used for determining individual process parameters and for monitoring the course of steps in a process. The control of the field devices and the actors is done using a central data capture-/control-unit, i.e. a control system. An example of a central data capture-/control-unit is the unit offered by the firm Endress+Hauser under the label 'Tank Side Monitor'. The control system is connected with the individual field devices and actors over a data bus. All data necessary for the process control, or process monitoring, as the case may be, are exchanged between the control system and the individual field devices/actors over the data bus. A data bus used often for industrial applications operates, for example, using the HART-Standard. Profibus PA and Fieldbus Foundation FF are, however, also used as field busses.

Besides the pure transmission of measurements, field devices also permit the transfer of various kinds of information stored in the field device, such as e.g. parameter information (null point, ranges of measured values, etc.), measurement curves, and measurement data and diagnosis information.

Before initially being placed in operation, a field device must usually be configured and parametered. The operating- and observation-programs required for the configuring and parametering mostly run on computer units (PC's, laptops), which are connected over a serial COM-interface, usually a serial RS-232 interface, with an adapter connected to the field bus/data bus. Commercially available operating- and observation-programs are offered, for example, by the assignee under the label CommuWin. Another operating- and observation-program is offered by the firm Endress+Hauser Wetzer under the label ReadWin.

Disadvantageous in the case of the above-mentioned operating- and observation-programs is that they can only be used in the immediate vicinity of the data bus/field bus. In order to be able to have access to the field device, or the data capture-/control-unit, from any arbitrarily remote location, it is known to use special application programs, which access over the Internet through an Internet interface and create the connection to the field bus, or the data bus, over appropriate gateways. Such a solution is relatively expensive and, consequently, not well suited for broad application.

A very advantageous solution which has become known proposes to access the operating- and observation-program through a serial interface. In this case, the operating- and observation program does not 'see' whether the connection is occurring over an RS-232 interface or over the WAN, LAN (e.g. Internet). In a first embodiment, the connection between the operating- and observation-program and the Internet interface is realized over a first COM interface, a null-modem cable, and a second COM interface. Alternatively, the connection between the operating- and observation-program and the Internet interface can occur over a virtual, serial interface. This embodiment requires, it is true, a higher programming expense than the first-mentioned, hardware solution. It's advantage, however, is that it is even usable in the case of e.g. a laptop not having two physically present, serial interfaces.

Access to a field device over the Internet entails, however, the danger that unauthorized persons (hackers) can vandalize the field device, or the control system, as the case may be, as soon as they have cracked the password protection. One solution, which does not effectively reduce or completely eliminate this danger of the accessing of the field device, or the process plant, as the case may be, for vandalism understandably cannot be discussed by the operator of a field device, or the process plant.

An object of the invention is to provide a method that blocks with high probability unauthorized accessing of a field device, or a data capture-/control-unit, in the field.

SUMMARY OF THE INVENTION

The object is solved in that the operator of the field device, or the central data capture-/control-unit, permits the external access unit targeted access to the field device, or the data capture-/control unit. Preferably, this access is only allowed temporarily.

According to an advantageous further development of the method of the invention, it is provided that different variants of access authorizations are established in advance; the operator of the field device, or the central data capture-/control-unit, as the case may be, has the possibility of choosing among the different variants of access authorizations and to target these to persons authorized by him. Consequently, the safety standard established by the operator for access to the field device, or the data capture-/control-unit, as the case may be, is always guaranteed. Additionally, it is provided that each established access authorization is issued by hardware and/or software.

For example, access authorizations for the readout of data and/or for configuring and/or parametering of a field device are issued. An unrestricted access to the field device, or the data capture-/control-unit, as the case may be, can, for example, be given without worry in the case of field tests or for review of a field device by the service personnel.

Readout of data is permitted, for example, within the framework of so-called Supply Chain Management. For example, a supplier has access to a fill level measuring device, which tells the fill level of a fill material in a container, material which the supplier has to supply. Or, emission credits are brokered and sold to the operators of plants whose emissions are above allowed levels.

According to a preferred embodiment of the method of the invention, the operator of the field device, or the field bus adapter, activates, on the basis of hardware, an actuating element on the field device, or the central data capture-/control-unit. Only after the operator has executed this method step is it possible to access the field device, or the field bus adapter, from an external access unit.

In order to achieve a double safeguarding of the field device against vandalism, an external accessing of the field device, or the central data capture-/control-unit, is only possible, when, in addition to the hardware-oriented unlocking, an agreed-upon password is named via the access unit. Additionally, the accessing of the field device from the remote access unit is only possible during a defined time interval, which is started, for example, with the activating of the above-mentioned actuating element. Naturally, the double safeguarding can also be realized in the reverse sequence.

As already mentioned, the external access unit can be operated by the service personnel. It is, however, especially advantageous, when access to the field device, or the field bus adapter, is enabled for a control authority, for example customs, the tax office, a standards organization or an environmental authority. In this instance, the concern is basically access to a field device in the public interest. Accessing of the device over the Internet from an arbitrary location saves the travel and presence of an inspector at the site. To prevent inappropriate accessing of the field device, or the plant, as the case may be, by the operator, appropriate safety measures can be provided, e.g. an electronic sealing of the field device or a hardware-oriented sealing of the field device. For example, an inappropriate accessing of a sealed field device is reported to the authority by the increasing of a counter.

BRIEF DESCRIPTION OF THE DRAWINGS

The invention will now be explained in greater detail on the basis of the following drawings, which show as follows:

FIG. 1: a schematic drawing of a field bus having a plurality of field devices, FIG. 2: a schematic drawing of a device for performing a method of the invention.

DESCRIPTION OF THE PREFERRED EMBODIMENTS

Figure 3:
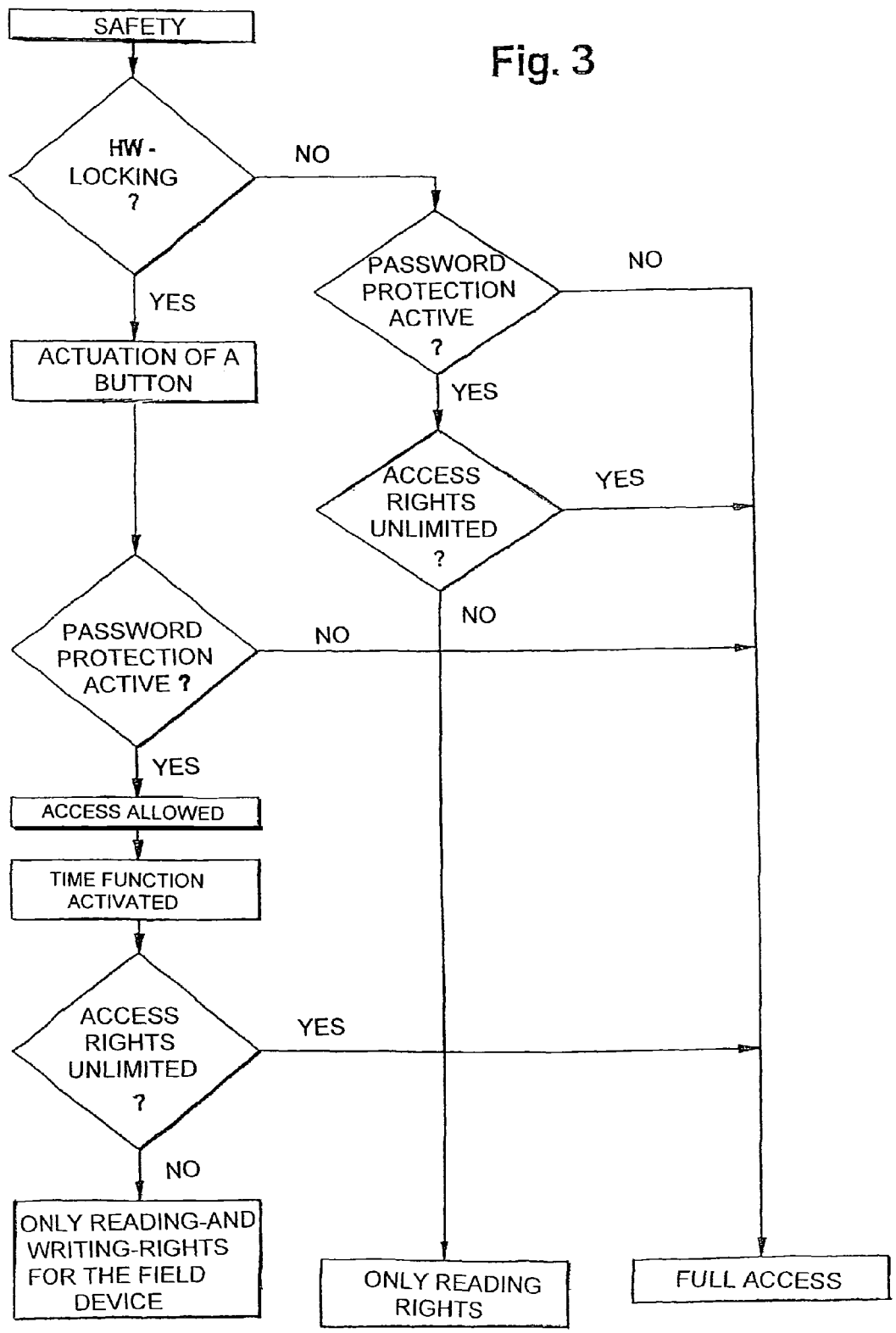
FIG. 3: a flow diagram illustrating a method of the invention.

FIGS. 1 and 2 show schematically the components of a device suited for performing a method according to the invention. FIG. 1 shows a known field bus 1 with a plurality of connected field devices 2, 3, 4. The field bus works according to one of the known international standards, such as e.g. HART®, Profibus® or Foundation Fieldbus®.

The field devices 2, 3, 4 are connected over a data bus 5 with a data capture-/control-unit 6, i.e. a control system. The field bus adapter 7 is connected via WAN, LAN (e.g. Internet) with a computer unit, i.e. an access unit, 8. Examples of a computer unit 8 are a personal computer (PC) or a portable laptop.

Examples of field devices 2, 3, 4 are e.g. temperature measuring devices, which register the temperature of a process medium, flow measuring devices, which register flow rate in a section of a pipeline, or fill level measuring devices, which determine the fill level of a fill material in a container.

The measurements are transmitted over the data bus 5 to the control system, or the field bus adapter 7, as the case may be. The control system 6 controls the total course of the process on the basis of the reported measurements.

Besides the pure transmission of measurements, intelligent field devices (smart field devices) permit also the transmission of other kinds of information stored in the field device. Thus, various parameters can be called up, or changed, as the case may be, by the control system 6, or the computer unit 8. Such parameters are e.g. null point, measurement range (interval), or the units, in which the measurements are issued.

Furthermore, for instance in the case of fill level measuring devices using the travel-time method, at least portions of the echo curve can be read out. From the echo curve, conclusions can be made concerning the operating condition of the fill level measuring device. Fill level measuring devices of this type are sold by the assignee under the label Micropilot.

Additionally, diagnosis information can also be retrieved. Some field devices 2, 3, 4 already have the capability of performing a self-diagnosis, i.e. certain parameters of the field device 2, 3, 4 are monitored for deviations away from their desired values.

Special operating- and observation-programs serve for presenting this information and parameter changes. These operating- and observation-programs are installed in the computer unit 8.

FIG. 2 shows an embodiment of a device of the invention. The computer unit, i.e. an access unit, 8 has a first COM-interface 10 and a second COM-interface 11. The two interfaces 10, 11 are connected together via a null-modem cable 12. The computer unit 8 has a WAN-, LAN-interface 13, which is connected by way of the WAN, LAN (Internet) with a field bus adapter 7. The operating- and application-program BA accesses the COM1-interface 10 of the computer unit 8 in the usual way. The data connection with the WAN-, LAN-interface 13 occurs over the null-modem cable 12 and the COM2-interface 11. The WAN-, LAN-interface 13 cares, using the appropriate driver program (Bus-Client), for converting the data to the TCP/IP standard, and uses a stored address book for selecting the appropriate Internet address of the field bus adapter 7. The data are exchanged between the computer unit/access unit 8 and the field bus adapter 7 over the WAN, LAN. The field bus adapter 7 cares for converting the protocol to the appropriate field bus standard, e.g. HART®. An additional advantage is that different field busses can be controlled over the WAN-, LAN-interface 13, without requiring a mechanical replugging.

FIG. 3 shows a flow diagram, in which advantageous and essential steps of the method of the invention are presented. Mainly, the invention enables the operator of the plant, or the field device 1, 2, 3, 4, as the case may be, to permit or prevent an accessing of a field device 1, 2, 3, 4 over the WAN, LAN.

The method steps in the left column of the figure represent quasi the highest safety level using combined hardware- and software-locking. An accessing of the device 1, 2, 3, 4, or the field bus adapter 7, over WAN, LAN (Internet) is, in this case, first possible, after the operator has actuated a button 14. Additionally, an accessing from the access unit 8 can only occur, when the agreed-upon password is named. First when both conditions have been fulfilled is the accessing of the field device 1, 2, 3, 4, or the data capture-/control-unit 6, allowed— and the accessing is possible only during a pre-set, or freely selectable by the operator, time span. The accessing rights themselves can be issued with limitations, or without limitations: Either they are purely reading rights or else a combination of reading and writing rights, with the writing rights enabling, for example, changing of parameters.

In the middle branch of the flow diagram, a less restrictive variant of the method of the invention is presented. In this case, the hardware locking is not used. Accessing of the field device 1, 2, 3, 4 can occur via an access unit 8, as soon as the correct password has been named. Again, the accessing rights can be distributed wholly targeted to authorized persons. For example, a supplier of a material stored in a container is given a continual reading right. This enables the supplier to monitor the fill level of the material in the container and, when required, to replenish such material. Catchword, or phrase, in this connection is the concept 'Supply Chain Management'.

In the right part of the flow diagram, the operator of the field device 1, 2, 3, 4, or the field bus adapter 7, allows an unlimited access via WAN, LAN (Internet). Thus, here, neither a hardware- nor a software-locking is provided. Such a variant is useful, for instance, during the field test phase of a new field device 1, 2, 3, 4.

Following the actuation of the switch 14, access to the field devices 2, 3, 4, or the field bus adapter 7, is possible for a certain time span. This safety level already offers a certain amount of protection against unauthorized accessing of the devices 2, 3, 4, 7. For instance, it is not out of the question that a plurality of accessings of the device might occur following actuation of the switch 14, and that perhaps one of them might be unauthorized. Therefore, in order to block unauthorized accessing, only the first accessing, or only one connection, is allowed after the actuation of the switch, while all additional accessing/connection attempts are rejected. This assumes that the first accessing following the switch actuation is authorized. However, should the first accessing be unauthorized, then this is noticed by the authorized accessor, since he is subsequently rejected. In this case, the authorized accessor can immediately institute countermeasures.

A further possibility of an access authorization is that the external access unit (8) must exhibit a predetermined IP-address, in which case accessing is only possible from one or more selected access units (8). The field device 2, 3, 4, or the field bus adapter 7, is provided with a TCP/IP interface, which is accessed by e.g. an integrated webserver. The following method is based essentially on the network layer (OSI layer 3) of the TCP/IP communications software. The Internet protocol IP implements the functions of the network layer in TCP/IP, it is e.g. responsible for the addressing, path search and segmenting of individual data packets. An IP-packet contains, among other things, the address of the sender and that of the receiver of the packet, the Internet Source Address and Internet Destination Address.

A special module (named in the following "IP-filter") of the field device/field bus adapter is so configured that only certain senders receive an answer from the field device/field bus adapter. To this end, the IP-addresses of the authorized senders are stored e.g. in a table. The entries of the table with the authorized sender IP addresses can be edited by a system administrator with full access rights. An additional safety would result, if the entries to the table can only be done over a service interface of the device on site. If the field device receives an IP-packet over any particular interface, the IP-filter first investigates the sender address and compares it with the entries in the table of the authorized IP addresses. If the sender address is contained in the table, the received packet is processed further, but, if the address is unknown, then the packet is thrown away. In this way, only known, trustworthy senders still have access to the field device; all others receive no answer.

A further possibility of access authorization is that the data exchange between the access unit (8) and a field device (1, 2, 3, 4), or the field bus adapter (7), occurs with encrypting. Advantageously, the SSL encryption method is used for this.

Advantageously, the IP-address of the access unit (8) is stored. In this way, a later identification of the access unit 8 is possible, for determining out of which unit the accessing of the field device (1, 2, 3, 4), or the field bus adapter (7), occurred.

The invention claimed is:

1. A method for safe data communication via WAN (Wide Area Network) or LAN (Local Area Network) between a remote access unit and a field device for determining or monitoring at least one physical or chemical process parameter, comprising the steps of:

permitting an on-site operator of the field device or the field bus adapter to allow a remote operator of the remote access unit a targeted access to the field device or the field bus adapter;

activating by the on-site operator an actuating element at the field device or the field bus adapter in order to enable a remote accessing of the field device or the field bus adapter to the remote operator for a defined time span; and servicing the field device or the field bus adapter during the defined time span via the remote access unit.

2. The method as defined in claim 1, further comprising the steps of:

predetermining different variants of access authorizations; and choosing among the different variants of access authorization, so that the safety standard desired for the field device or the field bus adapter by the operator is guaranteed.

3. The method as defined in claim 2, wherein:

the chosen access authorization is issued using hardware and/or software.

4. The method as defined in claim 2, wherein:

the access authorizations authorize the read-out of data and/or the configuring and/or parametering of the field device, or the plurality of field devices.

5. The method as defined in claim 1, wherein:

an external accessing of the field device or the field bus adapter is only possible, when an agreed-upon password is named from the external access unit.

6. The method as defined in claim 1, wherein:

an external accessing of the field device or the field bus adapter is only possible, when the external access unit has a predetermined IP-address.

7. The method as defined in claim 6, wherein:

the control authority is, one of: customs, the tax office, and an environmental authority.

8. The method as defined in claim 6, wherein:

the IP-address of the external access unit is stored.

9. The method as defined in claim 1, wherein:

an external accessing of the field device or the field bus adapter is only possible, when the external access unit uses a predetermined encryption method.

10. The method as defined in claim 9, wherein:

the SSL (Secure Sockets Layer) method is used as an encryption-/authentication-method.

11. The method as defined in claim 1, wherein:

the external access unit is operated by the service personnel or a control authority.

12. A method for safe data communication via WAN or LAN between a remote access unit and a field bus adapter, for data capture from, or control of, a plurality of field devices which serve for determining or monitoring at least one physical or chemical process parameter, comprising the steps of:

permitting an on-site operator of the field bus adapter to allow a remote operator of the remote access unit a targeted access to the field bus adapter;

activating by the on-site operator an actuating element at the the field bus adapter in order to enable a remote accessing of the field bus adapter to the remote operator for a defined time span; and servicing the field bus adapter during the defined time span via the remote access unit.

13. The method as defined in claim 12, further comprising the steps of:
   predetermining different variants of access authorizations; and
   choosing among the different variants of access authorizations, so that the safety standard desired for the field device or the field bus adapter by the operator is guaranteed.

14. The method as defined in claim 13, wherein:
   the access authorizations authorize the read-out of data and/or the configuring and/or parametering of the field device, or the plurality of field devices, as the case may be.

15. The method as defined in claim 12, wherein:
   the chosen access authorization is issued using hardware and/or software.

16. The method as defined in claim 12, wherein:
   an external accessing of the field device or the field bus adapter is only possible, when an agreed - upon password is named from the eternal access unit.

17. The method as defined in claim 12, wherein:
   an external accessing of the field device or the field bus adapter is only possible, when the external access unit has a predetermined IP-address.

18. The method as defined in claim 17, wherein:
   the control authority is, one of: customs, the tax office, and an environmental authority.

19. The method as defined in claim 17, wherein:
   the IP-address of the external access unit is stored.

20. The method as defined in claim 12, wherein:
   an external access of the field deice or the field bus adapter is only possible, when the external access unit uses a predetermined encryption method.

21. The method as defined in claim 20, wherein:
   the SSL method is used as the encryption-/authenticating-method.

22. The method as defined in claim 12, wherein:
   the external access unit is operated by the service personnel or a control authority.

\* \* \* \* \*